United States Patent
Noda et al.

(10) Patent No.: US 11,999,646 B2
(45) Date of Patent: Jun. 4, 2024

(54) MANUFACTURING METHOD OF POROUS GLASS BASE MATERIAL FOR OPTICAL FIBER AND MANUFACTURING APPARATUS

(71) Applicant: SHIN-ETSU CHEMICAL CO., LTD., Tokyo (JP)

(72) Inventors: Naoto Noda, Ibaraki (JP); Dai Inoue, Ibaraki (JP); Hitoshi Iinuma, Gunma (JP); Hiromasa Mizukami, Ibaraki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 354 days.

(21) Appl. No.: 17/267,496

(22) PCT Filed: Aug. 2, 2019

(86) PCT No.: PCT/JP2019/030486
§ 371 (c)(1),
(2) Date: Feb. 10, 2021

(87) PCT Pub. No.: WO2020/039893
PCT Pub. Date: Feb. 27, 2020

(65) Prior Publication Data
US 2021/0292222 A1    Sep. 23, 2021

(30) Foreign Application Priority Data
Aug. 23, 2018 (JP) .................. 2018-156708

(51) Int. Cl.
*C03B 37/018* (2006.01)
(52) U.S. Cl.
CPC .... *C03B 37/01815* (2013.01); *C03B 2207/32* (2013.01); *C03B 2207/34* (2013.01);
(Continued)

(58) Field of Classification Search
None
See application file for complete search history.

(56) References Cited

U.S. PATENT DOCUMENTS

2012/0276291 A1* 11/2012 Bird ................. C03B 37/01807
118/726
2013/0205832 A1    8/2013 Miyasaka et al.
(Continued)

FOREIGN PATENT DOCUMENTS

JP    2006327916 A    12/2006
JP    2013177297 A    9/2013
(Continued)

OTHER PUBLICATIONS

JP 2000239026 machine translation, Tsumura et al., Apparatus for feeding stock liquid for porous glass preform, Sep. 2000 (Year: 2000).*

(Continued)

*Primary Examiner* — Queenie S Dehghan
(74) *Attorney, Agent, or Firm* — HAUPTMAN HAM, LLP

(57) ABSTRACT

In a method of manufacturing porous glass base for optical fiber, a liquid organic siloxane raw material stored in a raw material tank of internal pressure P1 is controlled by a mass flow controller at a predetermined flow rate and pumped through pipe of internal pressure P2 to a vaporizer, the liquid raw material is vaporized in the vaporizer and supplied as a gas raw material to a burner, and the silica fine particles formed by burning the gas raw material in the burner are deposited to form a porous glass base material, where $P1 \leq P2$ is satisfied.

6 Claims, 2 Drawing Sheets

(52) U.S. Cl.
CPC ...... *C03B 2207/81* (2013.01); *C03B 2207/87* (2013.01); *C03B 2207/88* (2013.01)

(56) References Cited

U.S. PATENT DOCUMENTS

| | | |
|---|---|---|
| 2015/0007611 A1 | 1/2015 | Badeke et al. |
| 2017/0037501 A1 | 2/2017 | Oozeki |
| 2019/0092677 A1 | 3/2019 | Oozeki |

FOREIGN PATENT DOCUMENTS

| | | |
|---|---|---|
| JP | 2015505291 A | 2/2015 |
| JP | 201736172 A | 2/2017 |
| JP | 2017197402 A | 11/2017 |

OTHER PUBLICATIONS

JP H11255522 machine translation, Fujiwara et al., Production of Synthetic Quartz Glass, Sep. 1999 (Year: 1999).*
International Search Report in PCT Application No. PCT/JP2019/030486, dated Oct. 1, 2019, 3pp.
Written Opinion in PCT Application No. PCT/JP2019/030486, dated Oct. 1, 2019, 9pp.

* cited by examiner

MANUFACTURING METHOD OF POROUS GLASS BASE MATERIAL FOR OPTICAL FIBER AND MANUFACTURING APPARATUS

RELATED APPLICATIONS

The present application is a National Phase of International Application No. PCT/JP2019/030486, filed Aug. 2, 2019, and claims priority based on Japanese Patent Application No. 2018-156708, filed Aug. 23, 2018.

TECHNICAL FIELD

The present invention relates to a manufacturing method of porous glass base material for an optical fiber using organic siloxane raw material and a manufacturing apparatus.

BACKGROUND ART

The glass base material for optical fiber is produced by sintering the porous glass base material. The porous glass base material to be sintered is made by depositing silica fine particles on a starting material and is manufactured by VAD or OVD methods.

The silica fine particles deposited on the starting material are formed by burning the organic siloxane raw material in a burner (see, e.g., Patent Documents 1-4).

One method for forming silica fine particles is to use a liquid organic siloxane raw material (hereinafter referred to as a liquid raw material), such as octamethylcyclotetrasiloxane (OMCTS) (see, e.g., Patent Document 1). In the method of the Patent Document 1, silica fine particles are formed via steps of supplying the liquid raw material to a vaporizer, vaporizing the liquid raw material in the vaporizer to form a raw material gas, and burning the liquid raw material vaporized in a burner. In the method of Patent Document 1, the liquid raw material supplied to the vaporizer is controlled by a mass flow controller.

PRIOR ART REFERENCES

Patent Documents

Patent Document 1: JP2013-177297A
Patent Document 2: JP2015-505291A
Patent Document 3: JP2017-036172A
Patent Document 4: JP2017-197402A

SUMMARY OF THE INVENTION

Problems to be Solved by the Invention

However, in the method of Patent Document 1, the flow rate of the liquid raw material may fluctuate, for example, when the gas dissolves in the liquid raw material and bubbles of the dissolved gas are mixed in. As the flow rate of the supplied liquid raw material fluctuates, the amount of liquid raw material vaporization in the vaporizer also fluctuates accordingly, and the amount of raw material gas supplied to the burner fluctuates. When the amount of raw material gas supplied to the burner fluctuates, the combustion reaction in the burner becomes unstable and the amount of formation of silica fine particles fluctuates. As a result, the density of silica fine particles becomes non-uniform, which leads to lower manufacturing efficiency and defects such as poor dehydration and bubbles in the glass during the sintering of the resulting porous glass base material for optical fibers into transparent glass.

The present invention was made in view of the above problem, and it is an object of the present invention to suppress a flow rate fluctuation of the liquid raw material of the organic siloxane supplied to the vaporizer and to uniformize a deposition density of the silica fine particles.

Means for Solving the Problems

In order to solve the above problem, in the method of manufacturing the porous glass base material according to the present invention, a liquid organic siloxane raw material stored in a raw material tank of internal pressure $P_1$ is controlled by a mass flow controller at a predetermined flow rate and pumped through a pipe of internal pressure $P_2$ to a vaporizer, the liquid raw material is vaporized in the vaporizer and supplied as a gas raw material to a burner, and the silica fine particles formed by burning the gas raw material in the burner are deposited to form a porous glass base material. The present invention is characterized by the method of manufacture described above, wherein $P_1 \leq P_2$ is satisfied.

It is preferable that the above manufacturing method includes a step of pumping the liquid raw material in the raw material tank to the mass flow controller using a liquid feed pump. And when the pressure of the liquid raw material supplied to the mass flow controller is $P_3$, it is preferable that $P_1 \leq P_2 < P_3$ is satisfied. In addition, in the step of pumping, it is more preferable that the liquid feed pump raises the pressure of the liquid raw material to $P_4$, and supplies the liquid raw material to the mass flow controller while reducing the pressure to $P_3$ via the pressure loss unit, so that $P_1 \leq P_2 < P_3 < P_4$ is satisfied. In this case, it is preferable that $P_3 \leq 0.6 P_4$ is satisfied.

It is also preferable to return some or all of the liquid raw material pressurized to $P_4$ by the liquid feed pump to the raw material tank and supply the remainder to the mass flow controller.

In the present invention, $P_1 \leq 0.1$ MPa is preferable, and $P_1 \leq 0.05$ MPa is more preferable.

In the present invention, it is preferable to heat and keep the pipe through which the liquid raw material flows to maintain a temperature above the freezing point of the liquid raw material. In the present invention, the liquid raw material may be octamethylcyclotetrasiloxane (OMCTS).

A manufacturing apparatus of porous glass base material for optical fiber comprises: a raw material tank storing a liquid raw material, which is organic siloxane in a liquid state and filling the remaining space with inert gas; a liquid feed pump to pump the liquid raw material from the raw material tank; a circulating pipe that returns part or all of the liquid raw material pumped by the liquid feed pump to the raw material tank; a first supply pipe branched from the circulating pipe; a pressure loss unit provided downstream of the first supply pipe; a second supply pipe provided downstream of the pressure loss unit; a mass flow controller provided downstream of the pressure loss unit via the second supply pipe to control the flow rate of the liquid raw material to a predetermined flow value; a third supply pipe provided downstream of the mass flow controller; a vaporizer provided downstream of the mass flow controller via the third supply pipe to vaporize the liquid raw material; and a burner that combusts the raw material gas vaporized by the vaporizer to deposit silica fine particles. When the internal pressure of the raw material tank is $P_1$, the internal pressure of the circulating pipe is $P_4$, the internal pressure of the second supply pipe is $P_3$, and the internal pressure of the third supply pipe is $P_2$, $P_1 \leq P_2 < P_3 < P_4$ is satisfied.

In the present invention, it is preferable to provide heating/warmth-keeping unit for heating and keeping the circulating pipe, the first supply pipe, the second supply pipe, and the third supply pipe at a temperature above the freezing point of the liquid raw material.

Effects of Invention

According to the present invention, with respect to organic siloxane raw materials typified by octamethylcyclotetrasiloxane (OMCTS), it is possible to suppress the flow rate fluctuation in the liquid raw material supplied to the vaporizer and realize stable supply.

DESCRIPTION OF EMBODIMENTS

Figure 1:
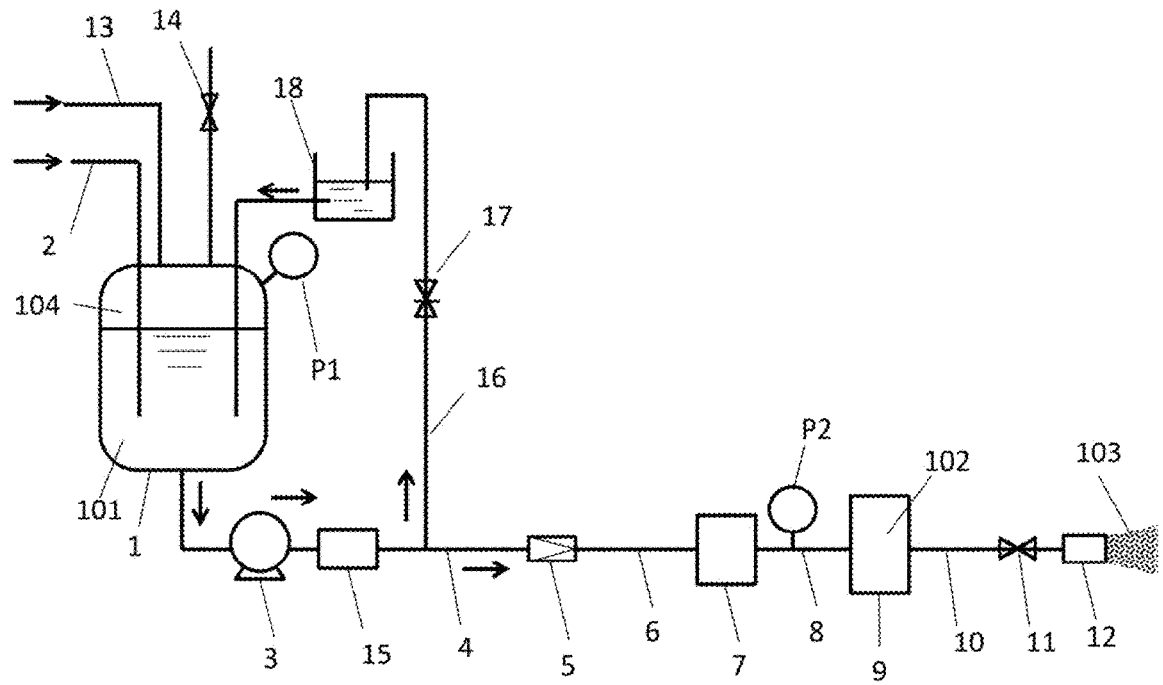
FIG. 1 illustrates the configuration of the porous glass base material manufacturing apparatus for optical fibers in the present embodiment.

Hereinafter, based on the embodiment, the present invention will be described in more detail. In the following description, portions already described are denoted by the same reference numerals, and description of the portion once described will be omitted accordingly.

FIG. 1 illustrates the raw material supply flow of the porous glass base material manufacturing apparatus for optical fiber. The porous glass matrix manufacturing apparatus for optical fiber shown in FIG. 1 has a raw material tank 1, a liquid feed pump 3, an accumulator 15, a pressure loss unit 5, 11, 17, a mass flow controller 7, a vaporizer 9, a burner 12, and an intermediate container 18, which are connected by piping.

The organic siloxane raw material in liquid form (hereinafter simply referred to as "liquid raw material") 101 is supplied from the raw material injection pipe 2 and stored in the raw material tank 1. At this time, the internal pressure of the raw material tank is set to $P_1$. The liquid raw material 101 stored in the raw material tank 1 is pressurized by the liquid feed pump 3 and pumped to the pressure loss unit 5 through a pipe 4. Here, let $P_4$ be the internal pressure in the pipe 4 that supplies liquid raw material 101 to the pressure loss unit 5.

The pressure loss unit 5 de-pressurizes the supplied liquid raw material and supplies the same to the mass flow controller 7 via a pipe 6. Here, let $P_3$ be the internal pressure in the pipe 6 that supplies liquid raw material 101 to the mass flow controller 7.

The mass flow controller 7 controls the supplied liquid raw material 101 to a predetermined flow rate and supplies the liquid raw material 101 to the vaporizer 9 through a pipe 8. Here, let $P_2$ be the internal pressure of the pipe 8.

The vaporizer 9 vaporizes the supplied liquid raw material 101 to make the raw material gas 102. The vaporized raw material gas 102 is de-pressurized as it passes through a pipe 10 and supplied to the burner 12. The burner 12 combusts the raw material gas 102 to produce silica fine particles 103, which are deposited on the starting material (not shown) by the combustion reaction. As described above, the porous glass base material for optical fibers can be manufactured.

In the manufacturing method using the porous glass base material manufacturing apparatus for optical fibers as described above, if gas bubbles are mixed in the liquid raw material 101 flowing through the pipe 8, the actual flow rate of the liquid raw material 101 supplied to the vaporizer 9 will fluctuate. As a result, the amount of liquid raw material 101 vaporized in the vaporizer 9 (i.e., the amount of the raw material gas 102 generated) fluctuates and becomes unstable, and the flow rate of raw material gas 102 flowing through the pipe 10 also becomes unstable. If the flow rate of raw material gas 102 flowing through the pipe 10 fluctuates, the production rate of silica fine particles 103 in the burner 12 becomes unstable, so the density of silica fine particles 103 deposited on the starting material fluctuates and becomes uneven. As a result, the density and shape of the produced porous glass base material becomes uneven.

Therefore, it is preferable to take out andpump the liquid raw material 101 from the bottom of the raw material tank 1 where far enough away from the liquid surface of the liquid raw material 101 stored in the raw material tank 1 to prevent as much as possible air bubbles from mixing with the liquid raw material 101 that is pumped from the raw material tank 1.

However, it is inevitable that some of the gases 104 in contact with the liquid surface of the liquid raw material 101 stored in the raw material tank 1 will dissolve in the liquid raw material 101. This dissolved gas 104 may foam in the pipe on the way to the vaporizer 9 and cause instability in the amount of the raw material gas produced in the vaporizer 9.

Therefore, in the porous glass matrix manufacturing device for optical fibers according to the present invention, liquid raw material 101 taken out from the raw material tank 1 is pressurized by the liquid feed pump 3. Here, the internal pressure $P_2$ of the pipe 8, which is located downstream of the mass flow controller 7 and supplies liquid raw material 101 to the vaporizer 9, should not be less than the internal pressure $P_1$ of the raw material tank 1 (i.e., $P_1 \leq P_2$). Specifically, if the internal pressure $P_1$ of the raw material tank 1 is set to be higher than atmospheric pressure, $P_1$ is adjusted by supplying inert gas regulated by a pressure regulator from the inert gas supply pipe 13. The discharge pressure of the liquid feed pump 3 is adjusted according to the pressure loss in the flow path from the liquid feed pump 3 to the pipe 8, and the pressure loss unit 11, such as a needle valve, is provided in the middle of the flow path from the pipe 8 to the burner 12 to adjust the pressure. By these methods, $P_2$ is adjusted so as to be sufficiently higher than the atmospheric pressure at the outlet of the burner 12 and not to be smaller than the internal pressure $P_1$ of the raw material tank 1. In this way, the gas 104 dissolving in the liquid raw material 101 can be effectively suppressed from foaming in the pipe 8.

Further, if a liquid containing air bubbles is flowed through the mass flow controller 7, accurate flow rate measurement becomes difficult, and the flow rate adjustment operation of the mass flow controller 7 may become unstable. Therefore, in addition to setting $P_1 \leq P_2$, the internal pressure $P_3$ of the pipe 6 located upstream of the mass flow controller 7 should not be less than the internal pressure $P_1$ of the raw material tank 1 (i.e., $P_1 \leq P_3$). Specifically, the internal pressure $P_1$ of the raw material tank 1 is adjusted by supplying inert gas regulated by a pressure regulator from the inert gas supply pipe 13. Also, by adjusting the discharge pressure of the liquid feed pump 3 according to the pressure loss in the flow path from the liquid feed pump 3 to the mass flow controller 7, the internal pressure $P_3$ of the pipe 6 is adjusted so that the internal pressure $P_3$ is not less than the internal pressure $P_1$ of the raw material tank 1. In addition, a pressure loss unit 11, such as a needle valve, is provided in the middle of the flow path from the mass flow controller 7 to the burner 12 to adjust the pressure. By these methods, $P_2$ is adjusted so as to be sufficiently higher than the atmospheric pressure at the outlet of the burner 12 and not to be smaller than the internal pressure $P_1$ of the raw material tank 1. In this way, air bubbles can be inhibited from entering the liquid raw material 101 that passes through the mass flow controller 7.

Here, it is preferable to make the internal pressure $P_3$ upstream (pipe 6 side) of the mass flow controller 7 higher than the internal pressure $P_2$ downstream (pipe 8 side) (i.e., $P_1 \leq P_2 < P_3$). In this way, the flow rate adjustment operation of the mass flow controller 7 is further stabilized. In particular, setting $P_3$ to a pressure higher than $P_2$ by 0.05 MPa or more is preferable because the flow rate adjustment operation of the mass flow controller 7 is stable. To realize such relationship between $P_3$ and $P_2$, the power of the liquid feed pump 3 may be adjusted so that the discharge pressure of the liquid feed pump 3 is sufficiently high according to the pressure loss in the flow path from the liquid feed pump 3 to the mass flow controller 7.

In addition, in the manufacturing method using the porous glass base material manufacturing apparatus for optical fibers as described above, the flow rate of liquid raw material 101 may fluctuate depending on the operation of the liquid feed pump 103. Namely, if the pressure upstream of the mass flow controller 7 fluctuates in a short period of time due to fluctuations in the discharge pressure of the pump with the internal motion of the pump when the liquid feed pump 3 pressurizes the liquid raw material 101, the flow rate adjustment by the mass flow controller 7 may not be able to keep up with the pressure fluctuations. Therefore, the pressure loss unit 5 (e.g., pressure reducing valve, orifice, etc.) should be provided between the pipe 4, where the liquid raw material 101 is discharged from the liquid feed pump 3, and the pipe 6, which supplies the liquid raw material 101 to the mass flow controller 7, so that the internal pressure $P_4$ of the pipe 4 is higher than the internal pressure $P_3$ of the pipe 6 (i.e., $P_3 < P_4$). In this way, the internal pressure $P_3$ of the pipe 6 is less susceptible to fluctuations in the discharge pressure of the liquid feed pump 3, and the flow rate adjustment operation by the mass flow controller 7 can be stabilized. In particular, if the pressure loss unit 5 is set so that the pressure of $P_3$ is approximately 0.6 times or less than $P_4$, it is preferable because the fluctuations of $P_3$ can be effectively suppressed. Summarizing the above, it is preferable that $P_1 \leq P_2 < P_3 < P_4$.

The end of the raw material injection pipe 2, which injects the liquid raw material 101 into the raw material tank 1, is installed so that the end of the raw material injection pipe 2 is below the liquid surface of the liquid raw material 101 stored in the raw material tank 1. In this way, it is possible to prevent the gas 104 existing in the space above the liquid surface of the liquid raw material 101 from being swallowed up and the bubbles of the gas 104 from being mixed into the liquid raw material 101.

When a highly flammable liquid raw material such as octamethylcyclotetrasiloxane (OMCTS) is used, the gas 104 in the space above the liquid surface of the liquid raw material 101 in the raw material tank 1 may be an inert gas, for example, nitrogen, argon, helium, etc. In this way, unintended oxidation reactions in the raw material tank 1 can be prevented. To supply these inert gases to the upper space of the raw material tank 1, an inert gas supply pipe 13 may be provided, as shown in FIG. 1.

The internal pressure $P_1$ of the raw material tank 1 may be maintained at a more positive pressure than atmospheric pressure. In this way, even if the raw material tank 1 has unintentional pinholes, etc., the outside air with oxygen can be prevented from flowing into the raw material tank 1.

On the other hand, it is preferable to reduce the internal pressure $P_1$ of the raw material tank 1 and the pressure fluctuation of $P_1$ to prevent excessive dissolution of the gas 104 into the liquid raw material 101 stored in the raw material tank 1. In particular, it is preferable to keep the gauge pressure of the internal pressure $P_1$ of the raw material tank 1 to 0.1 MPa or less, and even more preferable to keep it to 0.05 MPa or less. It is preferable to keep the pressure fluctuation of $P_1$ within ±0.01 MPa, and it is even more preferable to keep it within ±0.005 MPa.

When the liquid raw material 101 is vaporized in the vaporizer 9, the gas 104 dissolved in the liquid raw material 101 is also released. The gas 104 in the upper space of the raw material tank 1 should have a constant gas species (in the case of a mixture of gases, each gas species and mixing ratio thereof), and the fluctuation range of the internal pressure $P_1$ of the raw material tank 1 should be small. In this way, the amount of gas 104 dissolved in the liquid raw material 101 is stabilized. As the amount of gas 104 dissolved in the liquid raw material 101 stabilizes, the partial pressure of the gas 104 released in the vaporizer 9 is also stabilized. As a result, the flow rate of raw material gas 102 supplied to the burner 12 can be stabilized.

To adjust the pressure fluctuation of the internal pressure $P_1$ in the raw material tank 1, the pressure of the inert gas supplied from the inert gas supply pipe 13 may be adjusted with a pressure reducing valve (not shown) to maintain a constant pressure. A safety valve 14 and a back-pressure valve (not shown) may also be provided to maintain the internal pressure $P_1$ by de-pressurizing the raw material tank 1 so that the internal pressure $P_1$ falls below the predetermined pressure if the internal pressure $P_1$ unexpectedly exceeds the predetermined pressure.

As the liquid feed pump 3, a diaphragm pump may be used as a metering pump. Otherwise, a plunger pump or a gear pump may be used. If the pulsation of the pressure $P_4$ in the pipe 4 by the pump 3 is large, the pressure $P_3$ in the pipe 6 may also pulsate therewith. In order to suppress the pulsation of $P_3$, it is preferable to limit the fluctuation of $P_4$ to within ±0.1 MPa, and it is even more preferable to limit it to within ±0.05 MPa.

To suppress the pulsation of $P_3$, a pulsation-free pump may be used, or an accumulator 15 may be installed between the discharge side of the pump 3 and the pipe 4, and an orifice or other pressure loss unit may be installed. The accumulator 15 is a buffering device that suppresses the pulsation of the liquid by repeating the expansion and contraction of the diaphragm (rubber membrane) as the pulsating liquid passes through it.

As shown in FIG. 1, a pipe 16 may be branched from the middle of the pipe 4, and a pressure loss unit 17 such as orifice, safety valve, back pressure valve, needle valve, etc. may be attached therein to discharge part of the liquid raw material 101 pumped from the liquid feed pump 3 to the pipe 4. In this way, the fluctuation range of the internal pressure $P_1$ of the raw material tank 1 can be kept small.

In addition, the discharged liquid raw material 101 may be held in an intermediate container 18 and left to stand, for example, to remove unintentionally mixed air bubbles, and then the liquid raw material 101 may be returned to the raw material tank 1 for reuse.

Figure 2:
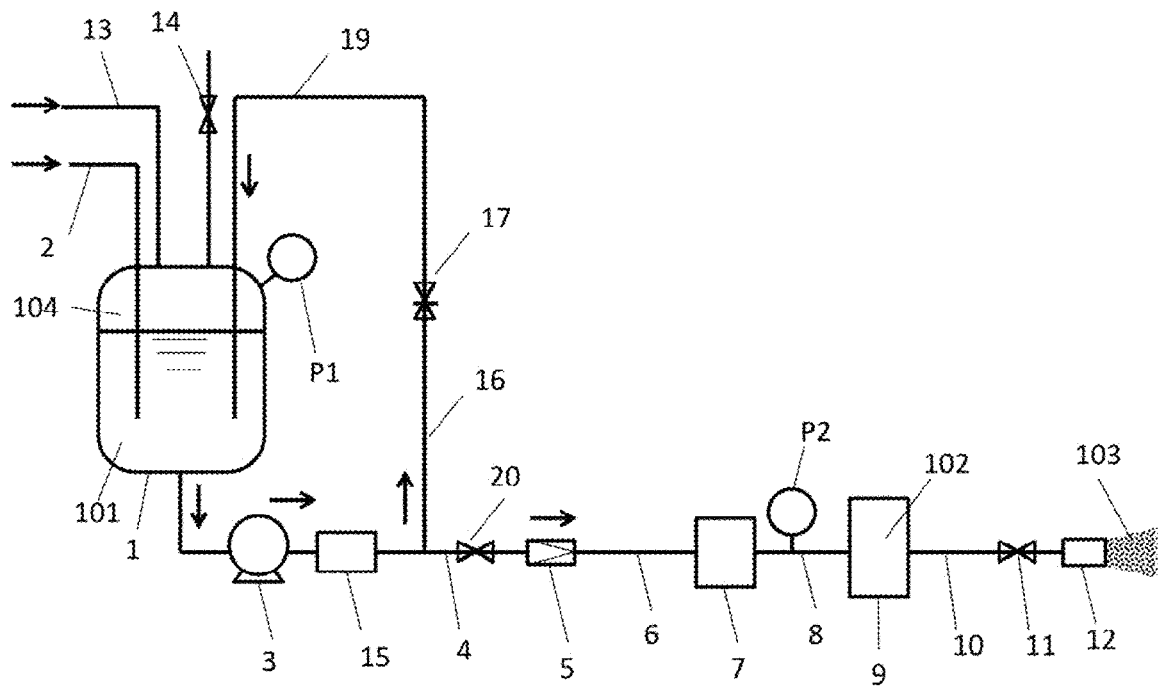
FIG. 2 illustrates the configuration of the porous glass base material manufacturing apparatus for optical fibers used in the Example.

FIG. 2 shows a modification of the porous glass base material manufacturing apparatus for optical fiber shown in FIG. 1. The porous glass base material manufacturing apparatus for optical fiber shown in FIG. 2 adopts a configuration in which liquid raw material 101 discharged through the pressure loss unit 17 is returned to the raw material tank 1 through a pipe 19. The liquid raw material 101 pumped from the raw material tank 1 circulates through the liquid feed pump 3, the pipe 4, the pipe 16, the pressure loss unit 17, and the pipe 19, and returns to the raw material tank 1. In this way, the discharged liquid raw material 101 can be easily reused.

The end of the pipe 19 returning the discharged liquid raw material 101 to the raw material tank 1, as in the case of raw material injection pipe 2, is preferably installed below the liquid surface of liquid raw material 101 in the raw material tank 1. With such a configuration, the liquid raw material 101 returning to the raw material tank 1 from the pipe 19 can prevent air bubbles from entering the liquid raw material 101 by entrapping the gas 104 that exists in the space above the liquid surface.

Example

The present invention will be described in detail with Examples below. In the examples, the porous glass base material manufacturing apparatus for optical fiber with the configuration shown in FIG. 2 was used. As the liquid raw material, liquid octamethylcyclotetrasiloxane (OMCTS) was used.

Initially, liquid raw material 101 was supplied to the raw material tank 1 through the raw material injection pipe 2 and stored. The liquid raw material 101 stored in the raw material tank 1 was then pumped into the pipe 4 by the liquid feed pump 3. A pipe 16 was branched from the middle of the pipe 4 to make a part of the liquid raw material 101, which passed through the pipe 16 and an orifice as a pressure loss unit 17, return to the raw material tank 1 through the pipe 19.

On the other hand, the rest of the liquid raw material 101 pumped into the pipe 4 was de-pressurized by a pressure reducing valve as a pressure loss unit 5, pumped into the pipe 6, and was fed to the vaporizer 9 through the pipe 8 by controlling the flow rate with a mass flow controller 7. The raw material tank 1 and the flow path from the raw material tank 1 to the vaporizer 9 were heated and kept warm as needed to maintain a temperature of 30-40° C. It is preferable that the temperature range to be kept warm is above the freezing point of the liquid raw material 101 and below the flashpoint. When using OMCTS as the liquid raw material 101, it is preferable to heat and keep the temperature between 17° C. and 52° C. because the freezing point of OMCTS is 17° C. and the flashpoint is 52° C.

The space above the liquid surface of liquid raw material 101 in the raw material tank 1 was filled with nitrogen supplied from the inert gas supply pipe 13. The internal pressure $P_1$ of the raw material tank 1 was maintained at an average of 0.045 MPa at gauge pressure, and the fluctuation range of $P_1$ during production (maximum value of $P_1$ – minimum value of $P_1$) was kept within ±0.005 MPa.

The discharge rate of the liquid feed pump 3 was set to 100 cc/min and the accumulator 15 was installed directly below the liquid feed pump 3. The internal pressure $P_4$ of pipe 4 was kept at 0.5±0.005 MPa at gauge pressure. The internal pressure $P_3$ of the pipe 6 was kept constant in the range of 0.19 to 0.40 MPa at gauge pressure, as shown in Examples 1-10 in Table 1 described later. The liquid raw material 101 was then fed by the mass flow controller 7 toward the vaporizer 9 at a flow rate in the range of 15 to 70 g/min as shown in Examples 1-10.

At the start-up of the apparatus, the liquid raw material 101 was circulated through the liquid feed pump 3, pipe 4, pipe 16, and the pressure loss unit 17 (orifice), and was returned from pipe 19 to the raw material tank 1, by operating the liquid feed pump 3 with the valve 20 installed upstream of the pressure loss unit 5 (pressure reducing valve) closed. By circulating the liquid raw material 101 in this way, the residual gas in the pipe can be pushed out and the pipe can be filled with bubble-free liquid raw material.

Figure 3:
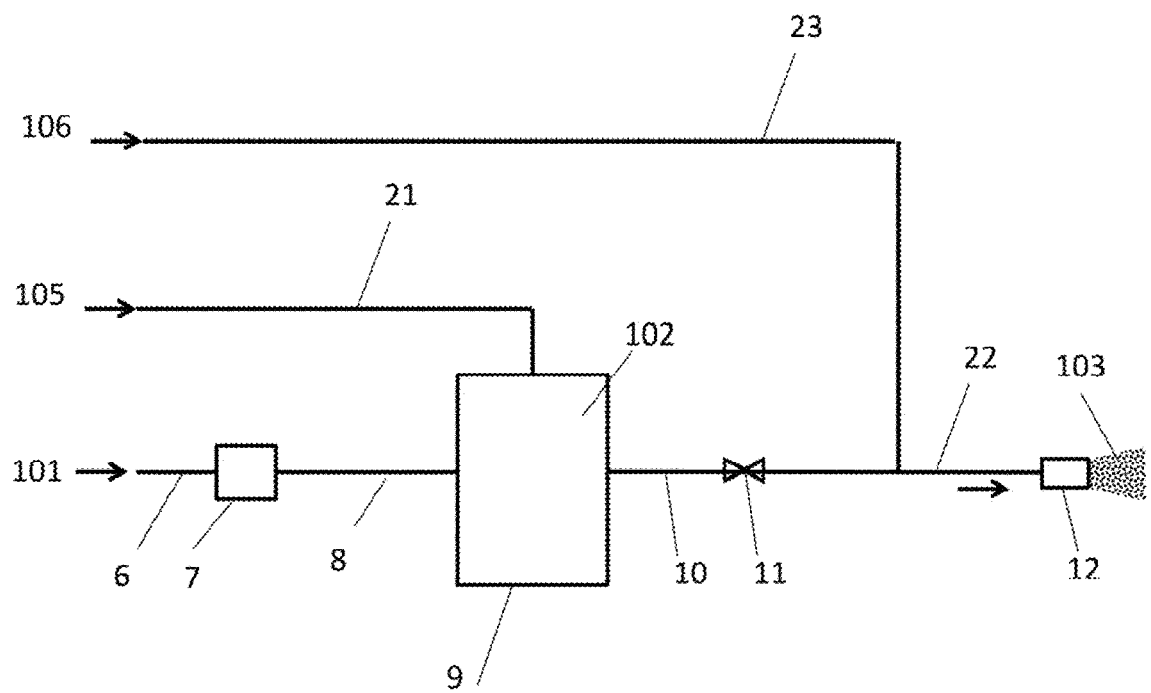
FIG. 3 illustrates the raw material supply flow around the vaporizer of the porous glass base material manufacturing apparatus for optical fibers in the Example.

FIG. 3 illustrates the raw material supply flow around the vaporizer in the Examples. The liquid raw material 101 pumped into the pipe 6, the flow rate of which was adjusted to a predetermined value (g/min) by the mass flow controller 7, was supplied to the vaporizer 9 through the pipe 8.

The temperature of the vaporizer 9 was set to 200° C. From the point of view of efficiently vaporizing the raw material OMCTS and preventing polymerization reactions, it is preferable to set the temperature of the vaporizer 9 to 150-250° C.

Nitrogen gas at a constant flow rate (0° C., 1 atm standard equivalent, L/min) heated to 200° C. in a heat exchanger as carrier gas 105 was supplied from a pipe 21 connected to the vaporizer 9. In this way, the liquid raw material 101 and the carrier gas 105 were mixed in the vaporizer 9 to promote the vaporization of the liquid raw material 101.

As the carrier gas 105, in addition to nitrogen, an inert gas such as argon or helium, oxygen, or a mixed gas of oxygen and an inert gas may be used. The flow rate of carrier gas 105 was controlled by a mass flow controller (not shown). The carrier gas 105 was supplied by heating with a heat exchanger (not shown).

The raw material gas 102, which is a mixture of the gas OMCTS obtained by vaporizing the liquid raw material 101 and nitrogen as the carrier gas 105, was supplied to the burner 12 through pipe 10 and a needle valve as a pressure loss unit 11. The pipe 10, the pressure loss unit 11 (needle valve), and a pipe 22 were heated to 190° C. to prevent condensation of the raw gas 102.

The raw material gas 102, which passed through the pressure loss unit 11 (needle valve), was further mixed with a constant flow of oxygen gas 106 heated to 200° C. through a pipe 23. This raw material gas 102 (a mixture of gas OMCTS and carrier gas) mixed with additional oxygen gas 106 was then supplied to the burner 12.

From the viewpoint of preventing recondensation of the liquid raw material 101, the oxygen gas 106 mixed here may be supplied at a state where heated in advance to a temperature higher than the liquefaction temperature expected from the partial pressure of the raw material gas 102 in the mixed gas by using a heat exchanger (not shown) or the like. By mixing oxygen with the raw material gas 102 in advance before supplying the burner 12, the combustion reaction of the raw material gas 102 in the burner 12 can be promoted.

In addition to the mixture of the gas, the burner 12 is supplied with combustible gas for combustion, oxygen gas for combustion, and seal gas, if necessary. Hydrogen, methane, ethane, and propane can be used as combustible gas for combustion. As a seal gas, an inert gas such as nitrogen, argon, helium, etc., or oxygen or a mixture of oxygen and an inert gas is preferably used.

In the flame of the burner 12, the raw material gas 102, the combustible gas for combustion, the oxygen gas for combustion, and the like are mixed and burned to form silica fine particles 103. The formed silica fine particles 103 were deposited on the starting material to form a porous glass matrix for optical fiber.

In addition, the porous glass base material was heated at 1500° C. in a helium-containing atmosphere to manufacture a transparent glass base material for optical fiber.

The internal pressure $P_1$ of the raw material tank 1, the internal pressure $P_4$ of the pipe 4, the internal pressure $P_3$ of the pipe 6, and the internal pressure $P_2$ of the pipe 8 were measured with pressure gauges as the gauge pressures in the above manufacturing method of the glass base material for optical fiber. ($P_3-P_2$) corresponds to the differential pressure before and after the mass flow controller 7. The flow rate of the mixture of the raw material gas 102 and the carrier gas 105 passing through the pipe 10 was measured by a mass flow meter. Measurements were performed for 10 minutes and the fluctuation rate of the mass flow meter reading (=(max−min)/mean×100%) was measured. The mass flow meter used was a thermal type, and the measurement was performed by summing up the mixture of raw material gas 102 and the carrier gas 105 in terms of $N_2$ heat capacity. Actual flow conversions by conversion factor and other factors were not performed.

Comparative Example 1 is an example of manufacturing porous glass base material using the same equipment as in the example, with different conditions. In Comparative Example 1, the porous glass base material was manufactured with the pressure loss unit 11 (needle valve) released and the internal pressure $P_2$ of the pipe 8 was set to 0.020 MPa at gauge pressure. In Comparative Example 1, the internal pressure $P_1$ of the raw material tank 1 is 0.045 MPa, so the relationship between $P_1$ and $P_2$ is $P_1>P_2$. As a result, the fluctuation rate of the flow rate exceeded 5%.

Figure 4:
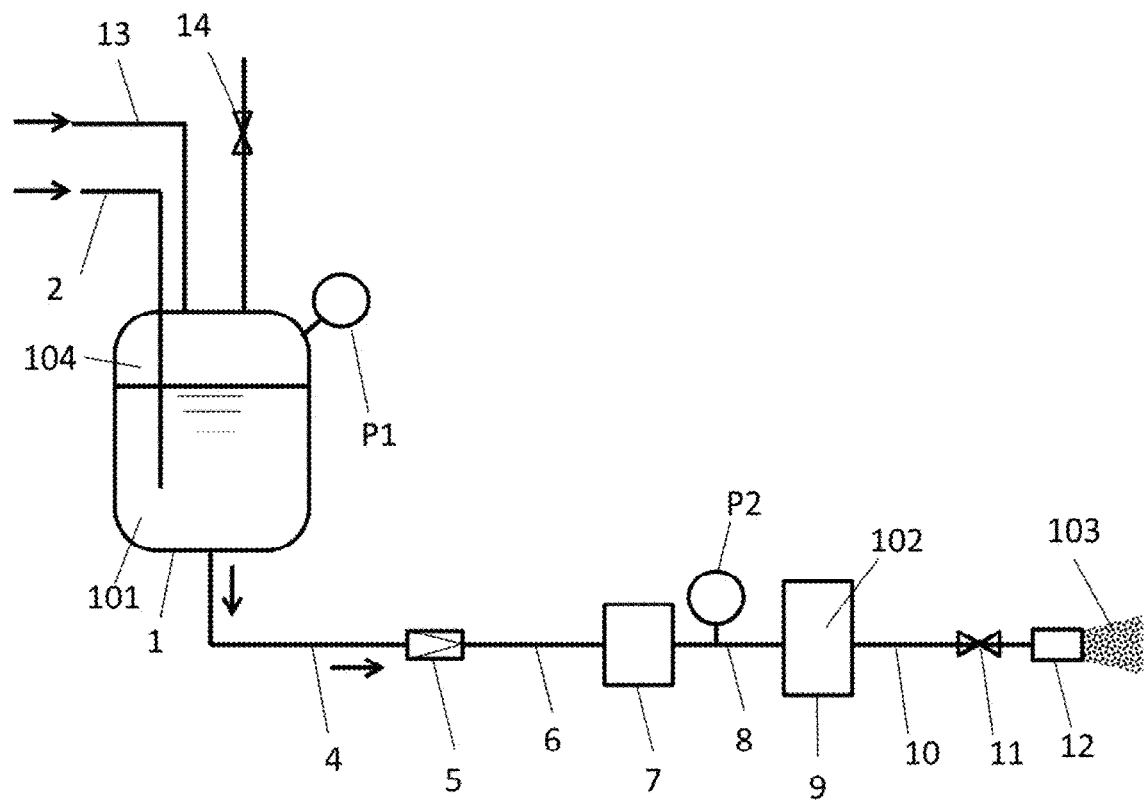
FIG. 4 illustrates the raw material supply flow of the porous glass base material manufacturing apparatus for optical fibers in the Comparative Example.

Comparative Example 2 is an example of manufacturing a porous glass base material with an apparatus without the liquid feed pump 3 as shown in FIG. 4. In the apparatus having such a configuration, the liquid raw material 101 was supplied with the supply pressure of nitrogen supplied from the inert gas supply pipe 13 set to 0.3 MPa. As a result, the fluctuation rate of the flow rate exceeded 10%.

The conditions and flow rate fluctuation for Examples 1-10 and Comparative Examples 1 and 2 are shown in Table 1.

TABLE 1

| | Pressure | | | | | Flow Rate | | Flow Rate Fluctuation |
|---|---|---|---|---|---|---|---|---|
| | Raw Material Tank P1 (MPa) | Piping 4 P4 (MPa) | Piping 6 P3 (MPa) | Piping 8 P2 (MPa) | P3-P2 (MPa) | OMCTS (g/min) | $N_2$ (l/min) | Fluctuation Rate (%) |
| Example 1 | 0.045 ± 0.005 | 0.5 ± 0.005 | 0.285 | 0.072 | 0.218 | 15 | 10 | 0.76% |
| Example 2 | 0.045 ± 0.005 | 0.5 ± 0.005 | 0.282 | 0.079 | 0.203 | 20 | 10 | 0.91% |
| Example 3 | 0.045 ± 0.005 | 0.5 ± 0.005 | 0.281 | 0.080 | 0.201 | 25 | 10 | 0.52% |
| Example 4 | 0.045 ± 0.005 | 0.5 ± 0.005 | 0.280 | 0.089 | 0.191 | 35 | 12 | 0.37% |
| Example 5 | 0.045 ± 0.005 | 0.5 ± 0.005 | 0.279 | 0.102 | 0.377 | 45 | 14 | 1.0% |
| Example 6 | 0.045 ± 0.005 | 0.5 ± 0.005 | 0.200 | 0.110 | 0.168 | 50 | 16 | 1.0% |
| Example 7 | 0.046 ± 0.005 | 0.5 ± 0.005 | 0.190 | 0.122 | 0.068 | 60 | 16 | 1.8% |
| Example 8 | 0.046 ± 0.006 | 0.5 ± 0.005 | 0.287 | 0.142 | 0.045 | 70 | 19 | 1.7% |
| Example 9 | 0.046 ± 0.006 | 0.5 ± 0.005 | 0.400 | 0.130 | 0.270 | 60 | 18 | 2.0% |
| Example 10 | 0.046 ± 0.006 | 0.5 ± 0.005 | 0.300 | 0.070 | 0.230 | 10 | 10 | 1.8% |
| Comparative Example 1 | 0.045 ± 0.005 | 0.5 ± 0.005 | 0.280 | 0.020 | 0.260 | 85 | 12 | 5.3% |
| Comparative Example 2 | 0.3 ± 0.006 | 0.3 ± 0.005 | 0.283 | 0.082 | 0.201 | 25 | 10 | 12% |

As shown as Examples 1-10 in Table 1, it can be seen that by setting $P_1 \leq P_2$, fluctuation in the flow rate of the raw material gas supplied to the burner can be suppressed. Further, from the comparison between each Example and Comparative Example 2, it can be seen that it is preferable that $P_1 \leq P_2 < P_3$.

As explained above, according to the present invention, the fluctuation in the flow rate of the liquid raw material supplied to the vaporizer can be suppressed and the supply of raw material gas that is vaporized and supplied to the burner can be stabilized.

REFERENCE SIGNS LIST

1 Raw material tank
2 Raw material injection pipe
3 Liquid feed pump
4, 6, 8, 16, 19 Liquid raw material pipe
5, 11, 17 Pressure loss unit
7 Mass flow controller
9 Vaporizer
10, 22 Gas raw material pipe
12 Burner
13 Inert gas supply pipe
14 Safety valve
15 Accumulator
18 Intermediate container
20 Valve
21 Carrier gas supply pipe
23 Oxygen supply pipe
101 Liquid raw material
102 Raw material gas
103 Silica fine particles
104 Gas in the raw material tank
105 Carrier gas
106 Oxygen Gas

The invention claimed is:

1. A manufacturing method of porous glass base material for optical fiber comprising:

pumping a liquid raw material of an organic siloxane stored in a raw material tank at internal pressure $P_1$ into a vaporizer through a pipe at internal pressure $P_2$, controlled by a mass flow controller at a predetermined flow rate;

vaporizing the liquid raw material in the vaporizer and supplying the vaporized raw material to a burner as a gas raw material; and forming a porous glass base material by depositing silica fine particles formed by burning the gas raw material in the burner, wherein $P_1 \leq P_2$ is satisfied, and wherein the manufacturing method further comprises a step of pumping the liquid raw material in the raw material tank to the mass flow controller using a liquid feed pump, wherein a pressure of the liquid raw material supplied to the mass flow controller is $P_3$, and in the step of pumping the liquid raw material, the liquid feed pump once pressurizes the pressure of the liquid raw material to $P_4$ and supplies the liquid raw material to the mass flow controller while reducing the pressure to $P_3$ via a pressure loss unit, so that $P_1 \leq P_2 < P_3 \leq 0.6\ P_4$ is satisfied.

2. The manufacturing method as claimed in claim 1, wherein part of the liquid raw material pressurized to $P_4$ by the liquid feed pump is returned to the raw material tank and the remainder is supplied to the mass flow controller.

3. The manufacturing method as claimed in claim 1, wherein $P_1 \leq 0.1$ MPa is satisfied.

4. The manufacturing method as claimed in claim 3, wherein $P_1 \leq 0.05$ MPa is satisfied.

5. The manufacturing method as claimed in claim 1, wherein the pipe through which said liquid raw material flows is heated and kept at a temperature above the freezing point of the liquid raw material.

6. The manufacturing method as claimed in claim 1, wherein the liquid raw material is octamethylcyclotetrasiloxane (OMCTS).

* * * * *